United States Patent [19]

Merkle

[11] Patent Number: 4,635,957

[45] Date of Patent: Jan. 13, 1987

[54] INDEPENDENT WHEEL SUSPENSION FOR A WHEEL OF A VEHICLE

[75] Inventor: Josef Merkle, Esslingen, Fed. Rep. of Germany

[73] Assignee: Daimler-Benz Aktiengesellschaft, Stuttgart, Fed. Rep. of Germany

[21] Appl. No.: 589,318

[22] Filed: Mar. 14, 1984

[30] Foreign Application Priority Data

Mar. 15, 1983 [DE] Fed. Rep. of Germany ....... 3309152

[51] Int. Cl.⁴ ............................................. B60G 3/00
[52] U.S. Cl. ..................................... 280/663; 280/691
[58] Field of Search ..................... 280/95 A, 660, 663, 280/664, 666, 670, 671, 672, 696, 691

[56] References Cited

U.S. PATENT DOCUMENTS

| 2,073,032 | 3/1937 | Stimson | 280/664 |
| 2,699,954 | 1/1955 | Harris et al. | 280/663 |
| 2,840,385 | 6/1958 | Heftler | 280/663 |

FOREIGN PATENT DOCUMENTS

| 707504 | 11/1936 | Fed. Rep. of Germany . | |
| 1138651 | 9/1954 | Fed. Rep. of Germany . | |
| 1078885 | 9/1957 | Fed. Rep. of Germany . | |
| 1070040 | 11/1959 | Fed. Rep. of Germany | 280/660 |
| 1286413 | 10/1963 | Fed. Rep. of Germany . | |
| 2220005 | 4/1972 | Fed. Rep. of Germany . | |
| 1255357 | 1/1969 | France | 280/664 |
| 2005171 | 12/1969 | France | 280/666 |
| 528173 | 6/1955 | Italy | 280/664 |
| 1105967 | 3/1968 | United Kingdom | 280/660 |

Primary Examiner—John J. Love
Assistant Examiner—Ross Weaver
Attorney, Agent, or Firm—Barnes & Thornburg

[57] ABSTRACT

An independent wheel suspension for a vehicle wheel comprises a wheel carrier having a steering linkage lever formed on an upper part thereof, a lower control arm connected to the carrier, an upper control arm connected to the carrier and pivoted in a bearing, and a steering tie rod connected to the steering linkage lever and to a steering mechanism. The steering linkage lever extends outwardly over the apex of the wheel to a point of connection with the steering tie rod. The tie rod lies in a horizontal plane and is substantially parallel to a longitudinal vertical center plane of the vehicle. The upper control arm extends longitudinally in side-by-side relation to the steering tie rod, and is pivoted about an axis which extends obliquely from a point of intersection with a central transverse wheel plane outwardly and downwardly (moving from the plane toward the bearing member). Provision is made for interconnecting two or more wheels provided with essentially identical suspensions in a serial fashion.

13 Claims, 4 Drawing Figures

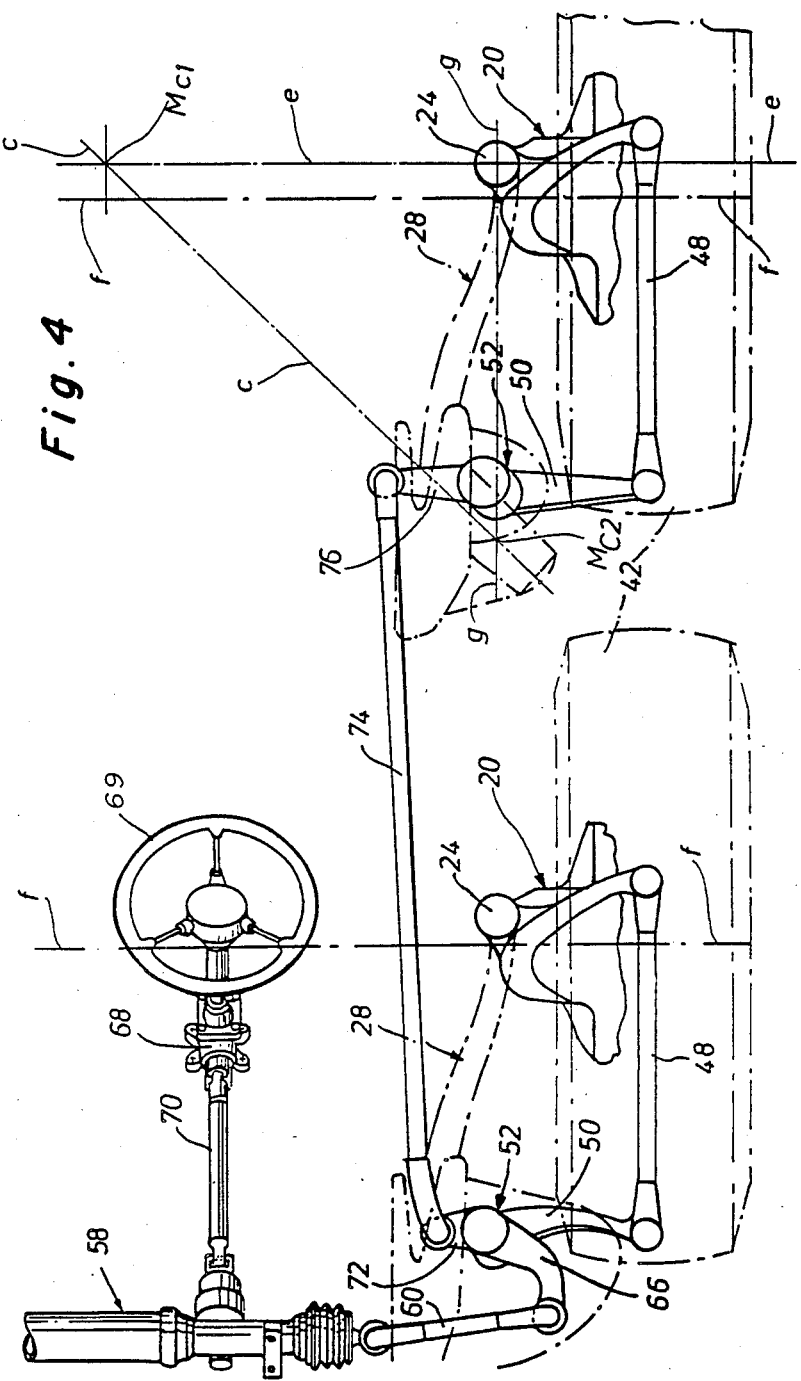

INDEPENDENT WHEEL SUSPENSION FOR A WHEEL OF A VEHICLE

BACKGROUND AND SUMMARY OF THE INVENTION

This invention relates to an independent wheel suspension for a wheel of a vehicle. More specifically, this invention relates to a wheel suspension for the steerable wheels of an automotive vehicle, of the type which comprises a wheel carrier having a steering linkage lever, upper and lower control arms connected to the wheel carrier, and a steering tie rod connected on one end to the steering linkage lever, and on the other end to a steering mechanism, such as a reversing gear train operable by a rack and pinion steering unit.

An independent wheel suspension having these features is described in German Patent No. 1,286,413. In the wheel suspension described there, the steering linkage lever is located approximately at the level of the steering knuckle pin of the wheel carrier. Thus, this component is located in the space between the wheel and the vehicle body, which also includes the steering tie rod articulated to the steering linkage lever.

This arrangement of the steering linkage lever leads to strong intrinsic steering forces on the wheel when the wheel is subjected to large vertical movements such as might be caused by driving over rough terrain. In addition, the arrangement of the steering linkage lever on the inside of the wheel requires a large amount of space. Such wheel suspensions are therefore unsuitable for cross-country vehicles which have a trough-like body structure filling the space between the wheel suspensions, and in which it is desirable to maximize the useful inner body space with respect to the total width of the vehicle.

Therefore, an object of this invention is to provide an independent wheel suspension, of the type described above, which is suited for use in cross-country vehicles, and particularly in special-purpose vehicles having a trough-like body structure in the area between the wheel suspensions. Another object of this invention is to provide a space-efficient suspension which allows for large vertical movement of the wheel, without the resulting disadvantageous development of intrinsic steering forces on the wheel and steering mechanisms. An additional object is to provide a wheel suspension which is well suited for ensuring a favorable action on the elements of the wheel suspension under very high loads, such as those which might occur in a cross-country vehicle.

These and other objects are attained in a wheel suspension which comprises a wheel carrier having a steering linkage lever formed at its upper end, a lower control arm connected to the wheel carrier, a generally horizontal steering tie rod which extends in a direction which is generally parallel to a longitudinal axis of the vehicle and which is connected at one end to the steering linkage lever and at a second end to a steering mechanism, and an upper control arm which is generally horizontal and extends in side-by-side relation with the steering tie rod and which has an effective length approximately equal to that of the steering tie rod. The upper control arm is connected at one end by an upper control joint to the wheel carrier at a point which is located laterally of and above the wheel on the body side of the wheel, and is pivotably connected on a second end to a bearing member, such that the control arm is pivotable about a bearing axis which extends obliquely from an imaginary point of intersection with a central transverse vertical plane which bisects the wheel. Additionally, the bearing axis of the upper control arm bearing member extends from the outside toward the inside of the vehicle and toward a vertical longitudinal center plane of the vehicle in a direction which is rearward, with respect to the front of the vehicle, and which is upward with respect to the center plane. The steering linkage lever extends transversely from the wheel carrier to a point of connection with the steering tie rod which is located over the apex of the wheel. The lower control arm is connected to the wheel carrier and to the vehicle body so as to form a transverse control arm having a lower bearing axis which is essentially parallel to a vertical longitudinal center plane of the vehicle and which is substantially horizontal. Alternatively, the lower bearing axis may be slightly inclined from the horizontal. The steering mechanism comprises a reversing gear train which has a lever arm connected to the steering tie rod at a point which is located over an apex of the wheel.

The arrangement of the steering linkage lever in accordance with this invention makes it possible to locate the steering tie rod above the wheel. Accordingly, no space need be provided for accomodating the steering linkage lever and the steering tie rod between the vehicle body and the wheel.

Furthermore, the lower control arm, extending perpendicularly away from the vehicle body, can be relatively short in design so that relatively little space is required for its accommodation.

It is thus possible to reduce the spacing between the wheel and the vehicle body, especially in the upper zone of the wheel periphery, and/or to correspondingly broaden the size of the vehicle body structure to gain useful interior space for the vehicle. This advantage is especially significant in special vehicle types having trough-like bodies which extend between the wheels relatively far in the downward direction and which widen toward the top in the lateral direction.

The essentially unidirectional arrangement of the steering tie rod and the upper control arm, and their approximately equal effective lengths, ensure that the wheel will not be subjected to wheel suspension induced steering forces during any wheel movements taking place during jouncing and rebounding.

In a particularly advantageous embodiment of the invention, the arrangement of the upper and lower bearing axes, as described above, make it possible to coordinate the kinematics of the wheel suspension in such a way that during jouncing and rebounding any changes in camber, as well as toe, of the wheel are avoided in spite of the large vertical wheel motions.

Furthermore, it is ensured that forces acting on the front section of the wheel (i.e., the part of the wheel adjacent to the steering tie rod, as viewed in FIG. 4), subject the steering tie rod to tensile, and not compressive stresses. Thus, an advantageous design of its cross section is made possible.

Furthermore, the connection points (or points of articulation) of the steering tie rod and the upper control arm can be positioned such that the components of the steering unit required for operating the steering tie rod can be mounted in the vehicle at a location where they occupy space not required for other installations and accessories. This is important, particularly in special-purpose vehicles wherein the position of the vehicle operator is to be in maximally close proximity to the front of the vehicle. In these vehicles, the space that would otherwise be occupied by the steering unit is needed for the pedal array located in the floor area directly in front of the operator at the forward end of the vehicle.

The wheel suspension of this invention is also suitable for vehicle wheels that are not steered. In this case, the steering tie rod is articulated (i.e. connected) to a joint attached to the body and, thus, takes over the function of a longitudinal strut for wheel guidance. With the aid of this tie rod, the wheel carrier can be blocked in a neutral position or with a desired toe angle. Accordingly, the steerable wheels, as well as the wheels of a vehicle that are not steerable, can be supported by means of essentially identically constructed wheel suspensions.

As noted, provision of the steering linkage lever on the upper portion of the wheel carrier makes it possible to install the reversing gear train, which operates the steering tie rod, in a relatively high level position with respect to the wheel axle. It is therefore possible to accommodate part of the steering mechanism in the front portion of the vehicle at a relatively high level. This part of the steering mechanism is located above the pedal array in a zone relatively remote from the operator. Thus, practically no useful space is occupied by this mechanism.

The reversing gear train of the steering mechanism is located within a protective cap. This arrangement ensures optimal protection for the gear train. The protective cap can simultaneously be utilized as the bearing bracket for the upper control arm bearing member.

A wheel suspension according to this invention can be designed so that two or more wheels on the same side of the vehicle are steerable by means of the steering linkage associated with the foremost wheel suspension. The resulting double-armed design of the steering lever offers an advantage in that the steering transmission rod leading respectively to the subsequent wheel suspension can be located within the vehicle body. This is important, particularly for vehicles with a smooth outer contour. However, it is also possible to locate the steering transmission rod above the upper control arm of the wheel carrier, preferably above the wheels and beside the vehicle body.

A wheel suspension wherein the upper control arm and the steering tie rod extend toward the rear of the vehicle is also within the scope of this invention. In this case, the same advantage can be attained with respect to the arrangement of the wheel steering system. The difference is that the elements of the steering mechanism accomodated within the vehicle body are located in a zone which is relatively far removed from the front end of the vehicle. This can prove to be advantageous in cross-country vehicles having a front-located engine.

Further objects, features, and advantages of the present invention will become more apparent from the following description when taken with the accompanying drawings which show, for purposes of illustration only, embodiments in accordance with the present invention.

BRIEF DESCRIPTION OF THE DRAWINGS

FIG. 4 shows a top view of two wheel suspensions, according to the present invention, arranged in series and connected together by a steering rod.

DETAILED DESCRIPTION OF THE DRAWINGS

Figure 1:
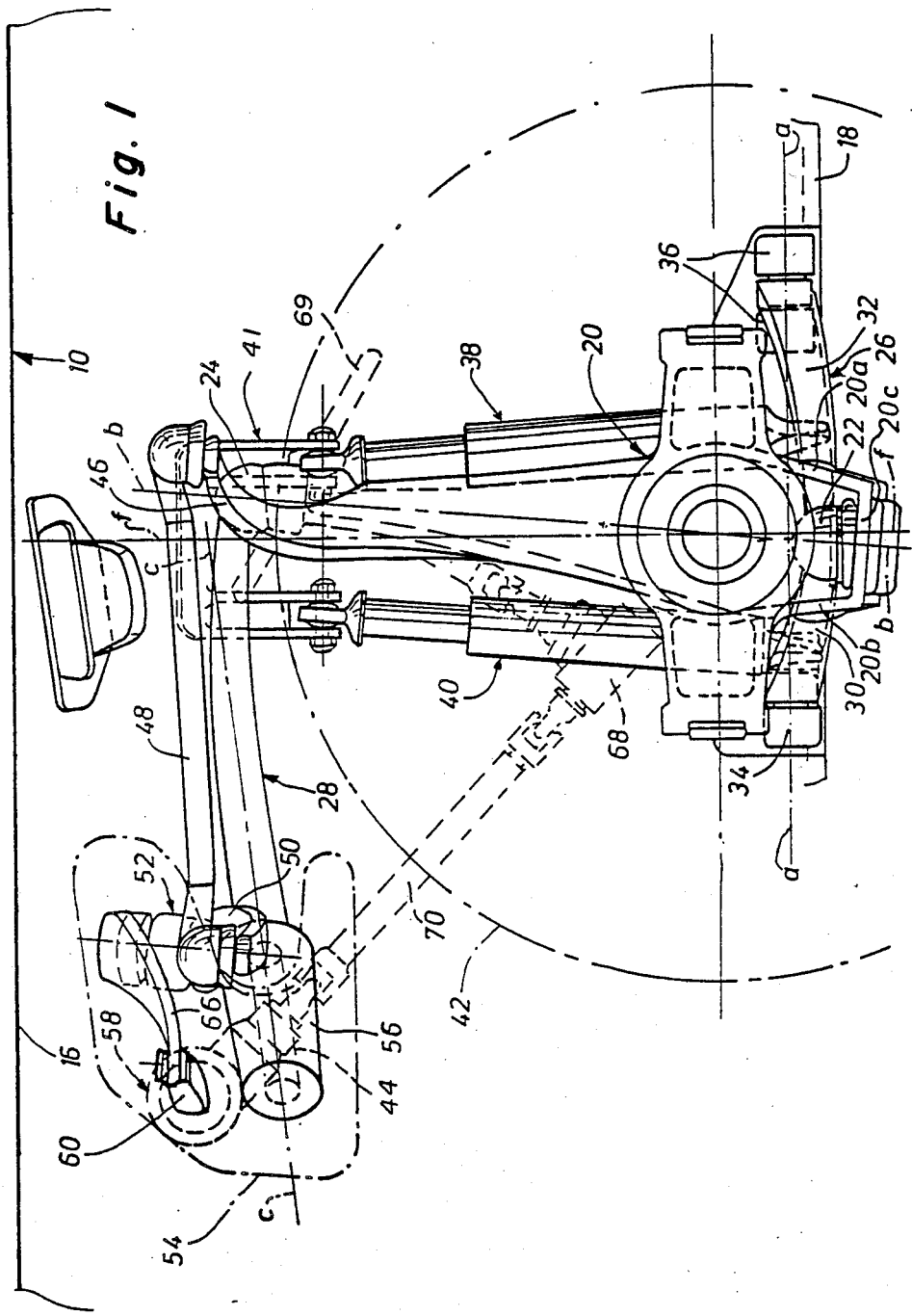
FIG. 1 shows, in a schematic view, a lateral illustration of the wheel suspension and the steering mechanism associated therewith.
Figure 2:
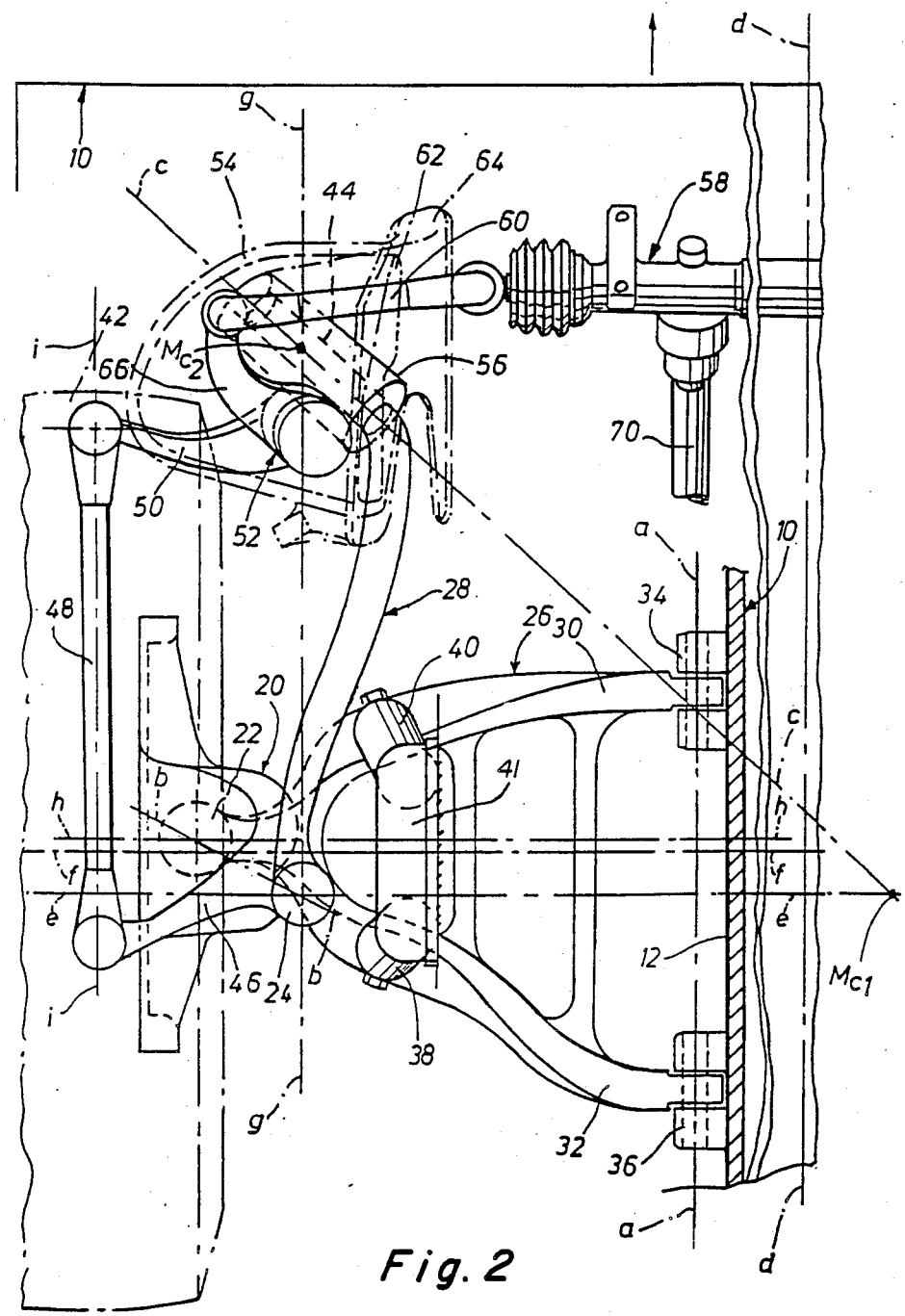
FIG. 2 shows a top view of the wheel suspension and steering mechanism of FIG. 1.

FIGS. 1 and 2 show a wheel suspension for a steerable front wheel of a special-purpose vehicle having a trough-like vehicle body, indicated generally by reference numeral 10.

Figure 3:
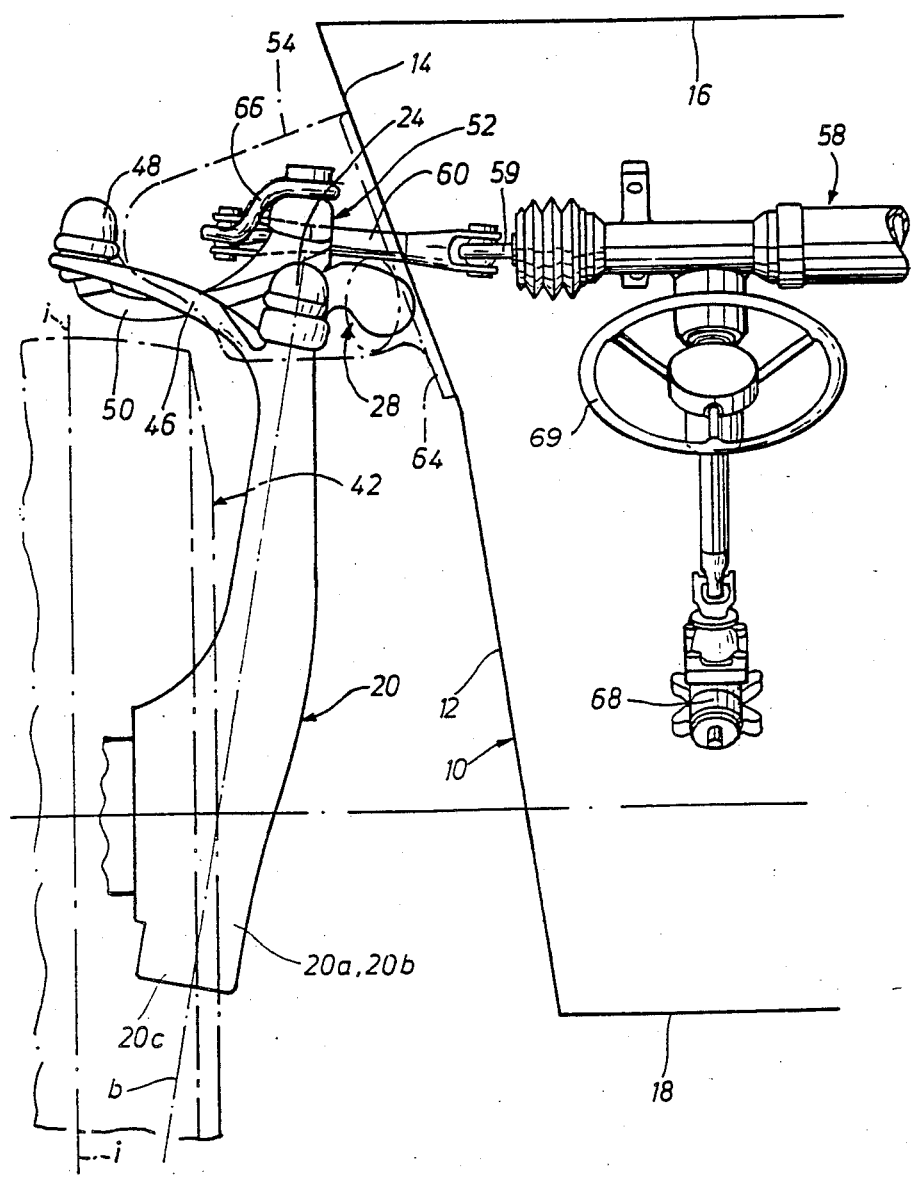
FIG. 3 shows an illustration of the wheel suspension and the steering mechanism as viewed while facing the forward driving direction.

The wheel suspension is located in a forward lateral zone of sidewall 12 of the vehicle body. Sidewall 12 extends obliquely and outwardly in the upward direction from bottom 18 of vehicle body 10. As shown in FIG. 3, sidewall 12 includes an outwardly angled, upper wall portion 14 in order to expand the useful space of the vehicle in this upper zone. The top edge 16 of the vehicle body is formed by a cover part. The wheel carrier is denoted in it entirety by reference numeral 20 and is connected by way of lower and upper control joints 22 and 24 to lower control arm 26 and upper control arm 28, respectively. These control arms are supported, with respect to vehicle body 10, as will be detailed below.

Wheel carrier 20 is advantageously designed as having a U-shaped profile at the bottom. Lower control joint 22 is seated in a protected fashion between the U-legs 20a and 20b on the connecting base 20c joining these legs together (i.e., joint 22 is located within the wheel carrier). The portion of wheel carrier 20 formed by 20a, 20b and 20c can also be closed on the side visible in FIG. 1.

Lower control arm 26 forms a wishbone, the control legs 30 and 32 of which are connected to pivot bearings 34 and 36, respectively, attached to body 10. The bearing axis a—a of lower control arm 26 preferably extends parallel to a vertical longitudinal center plan d—d of the vehicle, and lies approximately on, or deviates slightly from, the horizontal.

In the illustrated embodiment, hydropneumatic springs 38 and 40 rest on control arm legs 32 and 30, respectively. Springs 38 and 40 are connected at their upper ends to supporting bracket 41 which is attached to vehicle body 10. In place of these springs, it is possible to provide, for example, coil springs with shock absorbers arranged in the interior thereof (i.e., coil spring damper legs).

Lower and upper control joints 22 and 24 are positioned on wheel carrier 20 such that a vehicle wheel 42, indicated in broken lines, supported on wheel carrier 20 is steerable about an axis b—b which intersects the roadway in front of the contact point of wheel 42 and the roadway surface and, thus, conventionally effects a desired wheel caster to the front wheel arrangement.

Upper control arm 28 is essentially rod-shaped and extends between vehicle wheel 42 and sidewall 12. Upper control arm 28 thus constitutes a longitudinal control arm extending in the direction of the front of vehicle body 10. One end of upper control arm 28 is fashioned as a bearing pin 44, bent in such a way that the bearing axis c—c of upper control arm 28 extends from the outside obliquely inwardly and rearwardly, and, in the direction of the vertical longitudinal center plane d—d of the vehicle, upwardly (as shown in FIG. 1). Bearing axis c'c thus intersects a vertical transverse plane e—e, which passes through upper control joint 24 and lies behind (with respect to the front or driving end of the vehicle) central transverse wheel plane f—f, at point $Mc_1$, as shown in FIGS. 2 and 4. The axis c—c furthermore intersects a vertical longitudinal plane g—g, which also passes through upper control joint 24, at $Mc_2$.

Thus, point $Mc_1$ constitutes the center of movement of upper control joint 24 in a vertical transverse vehicle plane, whereas point $Mc_2$ forms the center of movement of upper control joint 24 in a vertical longitudinal vehicle plane.

Connected in this manner, upper control arm 28 acts as a transverse control arm as well as a longitudinal control arm. The center of rotation at point $Mc_1$ permits upper control arm 28, in cooperation with lower control arm 26 which also acts as a transverse control arm, to effect transverse guidance of wheel 42. The result is relatively little variations in camber and track. The center of rotation at point $Mc_2$ allows control arm 28, in cooperation with lower control arm 26, to effect longitudinal control of wheel 42, thus preventing intrinsic (i.e., unintended) steering motions of wheel 42 in the longitudinal direction of the vehicle.

As shown in FIG. 2, lower control joint 22 lies in vertical transverse vehicle plane h—h which is positioned in front of (with respect to the front or driving end of the vehicle) central transverse wheel plane f—f. By the displacement two control joints 22 and 24 from central transverse wheel plane f—f, and by positioning upper control joint 24 farther from the wheel than lower control joint 22, steering axis b—b is provided with an orientation which results in a positive steering roll diameter, in addition to the above-mentioned positive wheel caster.

To steer wheel 42, wheel carrier 20 is provided at its upper end with steering linkage lever 46, preferably formed integrally therewith. Linkage lever 46 extends toward the outside past the wheel tread surface approximately up to and/or over the wheel center plane i—i (FIG. 3). Connected at a joint provided at the end of steering linkage lever 46 is steering tie rod 48 which extends in a generally horizontal plane in the direction of the front end of the vehicle. As shown in FIG. 2, steering tie rod 48 extends essentially parallel to wheel center plane i—i. At its other end, steering tie rod 48 is connected to lever arm 50 of a steering lever which is denoted in its entirety by reference number 52. Steering lever 52 is supported within a protective cap 54, which comprises a metal cap or hood, mounted near the front end of the vehicle on the outside of sidewall 14. Protective cap 54 is designed to be closed on the side facing the front of the vehicle, and is provided with a slot-like aperture for the exiting of lever arm 50 which is connected to steering tie rod 48. Protective cap 54 also supports a bearing member 56 for upper control arm 28.

The wheel suspension described requires no mounting space between wheel 42 and vehicle body 10 for accommodating steering tie rod 48. Thus, it is possible to reduce the spacing between sidewall 12 and wheel 42, particularly in the upper wheel region, and to correspondingly widen the vehicle body superstructure to add to the useful interior space. This advantage can be especially significant in special purpose vehicles.

As can be seen from FIG. 2, the oscillation radii of upper control arm 28 and steering tie rod 48 essentially coincide with each other. This contributes to the reduction in unintended steering motions which might otherwise be superimposed on the wheel in the event of vertical wheel movements.

The high-level arrangement of steering tie rod 48 offers an additional advantage in that the steering mechanism coupling mutually opposite wheels together can be advantageously arranged in the vehicle. This is so because, since the wheel suspension is provided in the frontal zone (or optionally in the rear zone) of the vehicle, the steering mechanism can be arranged in the vehicle body at a high level and within a region not normally used for other purposes. Furthermore, protection is afforded from obstacles or rough roadways which might otherwise impact and damage a steering mechanism located in a lower level position.

The steering mechanism has a reversing linkage extending transversely in the horizontal direction in the upper frontal space of the vehicle. This reversing linkage preferably comprises a conventional rack and pinion mechanism 58 attached in a suitable fashion to an upper end wall portion of the vehicle body.

Connecting rod 60 is attached to the outer end of the operating rod displaceable by the rack. Connecting rod 60 extends through a slot-like recess 62 in upper wall portion 14 of the vehicle body, as well as through a mounting flange 64 of protective cap 54. Connecting rod 60 is further attached to lever arm 66 of the steering lever 52.

Operation of the rack and pinion steering unit 58 can be executed by a steering gear 68, operable by a steering wheel 69, and located underneath the seating position of the driver (i.e., in the proximity of the floor and in front of the vehicle end wall). Steering gear 68 cooperates with rack and pinion steering unit 58 by way of an upwardly extending shaft 70. The available space in this area is already restricted by the array of pedals provided in the floor region for the operator's use in controlling the vehicle. Thus, this arrangement avoids the necessity of also providing space for rack and pinion mechanism 58 in this region. Moreover, the above-described arrangement of steering tie rod 48 ensures that forces acting on wheel 42 from the forward driving direction will subject steering tie rod 48 to tensile stresses only.

The aforedescribed wheel suspension is suited equally well for wheels that cannot be steered. In this application, it is necessary to connect steering tie rod 48 to a joint affixed to the body instead of lever arm 50 of steering lever 52. Accordingly, an automotive vehicle can be equipped with wheel suspensions of identical construction for controlling its steerable wheels and its wheels that are not steered.

The arrangement described above also makes it possible to transmit steering motions to a single wheel carrier or to several wheel carriers arranged in serial fashion. As shown in FIG. 4, steering lever 52 can be equipped with a second lever arm 72 preferably extending in a direction opposite to lever arm 50. Connected to second lever arm 72 is transmission rod 74 which leads to third lever arm 76 of the steering lever 52 of a second wheel suspension, identical to the first suspension except that the length of lever arm 76 is altered in correspondence with the steering lock angle of wheel 42 of this second suspension.

The direction of extension of lever arms 72 and 76 makes it possible to locate steering transmission rod 74 within the vehicle body. In this case, lever arms 72 and 76 extend through corresponding wall cutouts in the sidewall of the vehicle.

Special-purpose wheeled vehicles can thus be equipped, for example, with a total of four steered wheels comprising two axle pairs. The wheels of one axle pair can be pivotable in the same direction while, with an appropriate design of the steering levers, the wheels of the second axle pair are pivotable in the opposite direction.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Independent wheel suspension for a wheel of a vehicle comprising:
    a wheel carrier having, at an upper end thereof, a steering linkage lever extending transversely toward the outside over the wheel;
    a lower control arm connected at a lower end of said wheel carrier;
    a steering tie rod extending in a first generally horizontal direction which is substantially parallel to a longitudinal axis of the vehicle, said steering tie rod having a first end connected to said steering linkage lever and a second end connected to a steering means; and
    a rod shaped upper control arm extending in a second generally horizontal direction in substantially side-by-side relation with said steering tie rod, said upper control arm having approximately the same effective length as said steering tie rod, said upper control arm also having a first end connected to said wheel carrier at a point located laterally of and above said steerable wheel between said wheel and a body portion of said vehicle, and said upper control arm having a second end pivotably connected to a bearing member such that said upper control arm is pivotable about an upper bearing axis which extends obliquely from a point of intersection with a transverse vertical plane intersecting said wheel;
    said steering tie rod and upper control arm extending in the direction from their respective connection toward the end of the vehicle adjacent the wheel, whereby said suspension arrangement effects a transverse guidance of said wheel while preventing intrinsic steering motions on the wheel in both the longitudinal and transverse direction of said vehicle when responding to driving induced movement of said wheel.

2. Independent wheel suspension according to claim 1, wherein said steering linkage lever extends transversely from said wheel carrier to a point of connection with said steering tie rod which is located above the wheel in a space defined by a vertical projection of the wheel outline.

3. Independent wheel suspension according to claim 1, wherein said upper bearing axis extends from the outside toward the inside of the vehicle and toward a vertical longitudinal center plane of said vehicle in a direction which is rearward with respect to a front portion of said vehicle and in a direction which is upward with respect to said center plane.

4. Independent wheel suspension according to claim 1, wherein said lower control arm connected to said wheel carrier is connected to said body portion of said vehicle, said lower control arm forming a transverse control arm having a lower bearing axis which is essentially parallel to a vertical longitudinal center plane of said vehicle and which is substantially horizontal.

5. Independent wheel suspension according to claim 4, wherein said lower bearing axis is slightly inclined with respect to the horizontal.

6. Independent wheel suspension according to claim 1, wherein said steering means comprises a reversing gear train having a lever arm connected to said tie rod at a point which is located above the wheel in a space defined by a vertical projection of the wheel outline.

7. Independent wheel suspension according to claim 6, wherein said reversing gear train is arranged within a protective cap from which said lever arm connected to said steering tie rod extends.

8. Independent wheel suspension according to claim 7, wherein said steering linkage includes a connecting rod which is connected to a second lever arm of said reversing gear train.

9. Independent wheel suspension for a wheel of a vehicle comprising:
    a wheel carrier for rotatably supporting a vehicle wheel, said wheel carrier extending upwardly adjacent the wheel to an upper carrier connection means disposed adjacent the top of the wheel,
    a steering linkage lever extending from the wheel carrier laterally outwardly with respect to a vehicle longitudinal center line to a steering linkage lever connection means located above the vehicle wheel,
    a steering tie rod having one end connected to the steering linkage lever connection means and extending with its other end to a connection with a steering control means,
    and an upper control arm connected at one of its ends to the upper carrier connection means and at its other end to a bearing member supported at a vehicle body part, said bearing member including a bearing member support defining an upper bearing pivot axis for the upper control arm which extends obliquely with respect to the vehicle longitudinal center line,
    wherein said steering tie rod and upper control arm extend substantially parallel to one another in side-by-side relation in a direction substantially parallel to the vehicle longitudinal center line with said steering tie rod being disposed above the wheel.

10. Independent wheel suspension according to claim 9, wherein said upper bearing pivot axis extends in a direction toward the center line of the vehicle in the rearward direction and extends upwardly in the rearward direction of the vehicle.

11. Independent wheel suspension according to claim 9, further comprising a lower control arm pivotably connected at a lower part of the wheel carrier and at a vehicle body part.

12. Independent wheel suspension according to claim 11, wherein said lower control arm is pivotably connected at the vehicle body port so as to be pivotable about an axis extending substantially parallel to the vehicle longitudinal center line.

13. Independent wheel suspension according to claim 9, wherein said steering tie rod and upper control arm are substantially the same length and are connected respectively at the wheel carrier at substantially the same longitudinal position with respect to the vehicle.

* * * * *